United States Patent
Schimpf et al.

(10) Patent No.: US 12,055,209 B2
(45) Date of Patent: Aug. 6, 2024

(54) TRANSMISSION DEVICE HAVING AN OIL COLLECTOR

(71) Applicant: Schaeffler Technologies AG & Co. KG, Herzogenaurach (DE)

(72) Inventors: Ralph Schimpf, Nuremberg (DE); Michael Keck, OT Brunn (DE); Jan Heymel, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/039,606

(22) PCT Filed: Nov. 15, 2021

(86) PCT No.: PCT/DE2021/100908
§ 371 (c)(1),
(2) Date: May 31, 2023

(87) PCT Pub. No.: WO2022/117145
PCT Pub. Date: Jun. 9, 2022

(65) Prior Publication Data
US 2024/0093775 A1  Mar. 21, 2024

(30) Foreign Application Priority Data
Dec. 2, 2020 (DE) ............ 10 2020 131 946.0

(51) Int. Cl.
*F16H 57/04* (2010.01)
(52) U.S. Cl.
CPC ..... *F16H 57/0427* (2013.01); *F16H 57/0479* (2013.01)

(58) Field of Classification Search
CPC .... F16H 57/04; F16H 57/042; F16H 57/0427; F16H 57/0479; F16H 57/0482; F16H 57/0484
See application file for complete search history.

(56) References Cited

U.S. PATENT DOCUMENTS

| | | | |
|---|---|---|---|
| 6,702,711 B2 | 3/2004 | Zelikov et al. | |
| 10,240,670 B2 * | 3/2019 | Riedisser | F16H 57/0427 |
| 2009/0247348 A1 * | 10/2009 | Haupt | F16C 33/6677 |
| | | | 475/159 |

FOREIGN PATENT DOCUMENTS

| | | |
|---|---|---|
| DE | 10361701 A1 | 8/2005 |
| DE | 102010032252 A1 | 1/2012 |

(Continued)

*Primary Examiner* — Timothy Hannon

(57) ABSTRACT

A transmission device includes an axis of rotation defining an axial direction, a supporting component, and an oil collector. The supporting component includes connecting holes and oil inlets. The oil collector includes a support plate, a channel connected to the support plate, oil guiding nozzles plugged axially into the oil inlets, fastening elements for holding the oil collector on the supporting component, and platforms disposed on a side of the fastening elements facing away from the supporting component. The channel runs around the axis of rotation and includes an outer contour. The fastening elements are at least partially fixedly engaged with the connecting holes. The platforms project radially from the oil collector radially beyond the outer contour. Each platform includes a planar surface and a projection. The projection projects out of the planar surface and axially beyond the platform.

16 Claims, 2 Drawing Sheets

(56) References Cited

FOREIGN PATENT DOCUMENTS

| | | |
|---|---|---|
| DE | 102011005724 A1 | 9/2012 |
| DE | 112009000602 B4 | 1/2013 |
| DE | 102012223226 A1 | 6/2014 |
| DE | 102012223228 A1 | 6/2014 |
| DE | 102013206880 B3 | 7/2014 |
| DE | 102013215882 A1 | 2/2015 |
| DE | 102014208003 A1 | 10/2015 |
| DE | 112012000461 B4 | 6/2018 |
| DE | 102018123592 A1 | 3/2020 |
| DE | 102020102241 B3 | 4/2021 |
| DE | 102020114322 A1 | 12/2021 |
| JP | S563352 A | 1/1981 |
| JP | H0625643 U | 4/1994 |
| JP | 2003097520 A | 4/2003 |
| JP | 2013072458 A | 4/2013 |

\* cited by examiner

TRANSMISSION DEVICE HAVING AN OIL COLLECTOR

CROSS-REFERENCE TO RELATED APPLICATIONS

This application is the United States National Phase of PCT Appln. No. PCT/DE2021/100908 filed Nov. 15, 2021, which claims priority to German Application No. DE102020131946.0 filed Dec. 2, 2020, the entire disclosures of which are incorporated by reference herein.

TECHNICAL FIELD

The present disclosure relates to a transmission device having at least one oil collector and at least one supporting component with connecting holes and oil inlets. The oil collector has at least one support plate and a channel connected to the support plate and running around an axially aligned axis of rotation of the transmission device. The oil collector is also provided with oil guiding nozzles and with fastening elements, and, in each case, one oil guiding nozzle is plugged axially in one of the oil inlets. The oil collector is held on the supporting component by means of the fastening elements which at least partially engage fixedly in each case into one of the connecting holes.

BACKGROUND

Such a transmission device is disclosed in DE 10 2011 005 724 A1. This transmission device is part of a drive unit driven by an electric machine. Oil collectors are auxiliary devices that are used to collect lubricating oil in transmission devices, and the lubricating oil that is caught and collected in the channel is directed to lubricating points that are otherwise difficult to access or that are not adequately supplied due to centrifugal forces. The oil collector has a support plate and a channel connected to the support plate. The oil collector or the support plate is equipped with oil guiding nozzles and fastening elements. The oil guiding nozzles are each plugged axially in one of the oil passages of a clutch component. The oil collector is held on the clutch component by means of the fastening elements. On a side facing away from the transmission device, each of the fastening elements is followed in the axial direction by a flat platform on the oil collector. The oil collector is supported in the axial direction on the clutch component by projecting sections that project axially from the platform and is kept at a distance such that radial through-slots are formed between the platform and a channel of the oil collector in the area of the fastening elements. Some of the lubricant can be routed past the groove of the oil collector and thus the oil guiding nozzle via these slots.

Planetary drives with an oil collector are disclosed respectively by U.S. Pat. No. 10,240,670 B2 or DE 10 2013 206 880 B3. The oil guiding nozzles of each open into blind holes in the planetary bolts. Lubrication holes lead from the blind holes to planetary bearings. The oil guiding nozzles in the oil collector disclosed in U.S. Pat. No. 10,240,670 B2 are also used as a fastening element in that they are plugged axially in the lubrication holes. In the transmission device disclosed in DE 10 2013 206 880 B3, the oil collecting nozzles, which are also designed as fastening elements, engage behind a carrier section of a planetary carrier. In a further transmission device disclosed in DE 10 2020 102 241 B3, the channel of the oil collector rests against the planet carrier in an axially roughly sealing manner. This eliminates the oil guiding nozzles. Only short projections are formed on the oil collector, which project axially into the lubricating holes.

SUMMARY

The present disclosure provides a transmission device that can be manufactured inexpensively and assembled easily.

According to the present disclosure, each of the fastening elements is followed in the axial direction by a platform formed on the channel of the oil collector on a side facing away from the transmission device or from the supporting component, and which projects radially beyond an outer contour of the channel. On each of the platforms, at least one projection that rises axially over the platform and over the surface projects from a planar surface of the respective platform. Thus, the projection is used as an aid for positional orientation during assembly of the oil collector on the supporting component of the transmission device and is therefore provided for the correct assembly positioning of both the oil guiding nozzle for the oil inlets and the fastening elements for the connecting holes. In addition, if the projections are designed appropriately, the oil collector can also be gripped or guided over the projections during assembly.

One embodiment of the disclosure provides that the respective surface from which the respective projection projects axially runs in an imaginary radial plane perpendicularly penetrated by the axis of rotation. The planar surfaces of all platforms can lie in a common imaginary radial plane or the planar surfaces or their radial planes can be axially offset from one another. Thus, the surfaces are used as reference surfaces, via which the oil collector can be precisely aligned during assembly on the supporting component and which facilitate exact positioning of the oil collector with respect to the supporting component or the transmission device.

A further embodiment of the disclosure provides that in each case one of the fastening elements projects axially from the respective platform on a side facing the supporting component—e.g., formed in one piece with the platform. Thus, the radial spacing of the fastening elements is not necessarily dependent on the radial extent of the support plate or the channel and can extend radially beyond this by means of a corresponding design of the platforms. Here, the radial spacing of the fastening elements is not or is only partially dependent on the radial dimensions of the support plate or the channel due to a corresponding design of the platforms. If necessary, the platforms with the fastening elements can project radially beyond the outer contours of the oil collector. The platforms thus form a radial extension from which the fastening elements project. The distances between the fastening points (fastening elements) of the oil collector can consequently be adapted to the design of the supporting component via the dimensions of the platforms, regardless of the position of the actual oil guide.

A further embodiment of the disclosure provides that the respective projection is designed as a rib connected to the respective platform and the channel. On the one hand, a rib can be gripped easily during assembly and, on the other hand, the rib forms a stiffening of the fastening elements or as a stiffening for the connection of the fastening elements to the oil collector. The latter is helpful, for example, when the fastening elements are pressed or snapped into the connecting holes with increased force for the purpose of press or snap connection.

One embodiment of the present disclosure provides that a releasable or non-releasable positive snap connection is implemented in or on the connecting holes between the supporting component and the fastening elements. The fastening elements are designed, for example, as snap hooks or have an expanding dowel-like design, which is relatively easy to implement when producing oil collectors made of plastic. In the connecting holes, either corresponding undercuts are formed for hooking the snap hooks or expansion dowels, or the hooks or expansion elements reach through the respective connecting hole axially and hook the wall or a wall section of the supporting component on the other side, engaging behind it.

One embodiment of the present disclosure provides that the transmission device has at least one planetary gear. The supporting component may be designed, for example, as a carrier flange and is part of the planetary carrier of the planetary gear. The planetary gear has planetary wheels mounted on planetary bolts. The planetary bolts are accommodated on one side on or in the carrier flange. Alternatively, the supporting component can be another functional element; for example, a clutch housing for a multi-plate clutch, or it can be designed as any other component.

A further embodiment of the disclosure provides that the oil inlets are formed in the planetary bolts. The respective oil guiding nozzle, either one, several or all of the oil guiding nozzles of the oil collector engages in one of the oil bores of the planetary bolt, which usually extend in the axial direction in the planetary bolt and are designed as through-holes or blind holes. A cross-bore leads from the respective oil bores to at least one planetary bearing of at least one planetary wheel.

BRIEF DESCRIPTION OF THE DRAWINGS

In the following, the present disclosure is explained in more detail with reference to an exemplary embodiment. In the figures.

DETAILED DESCRIPTION

Figure 1:
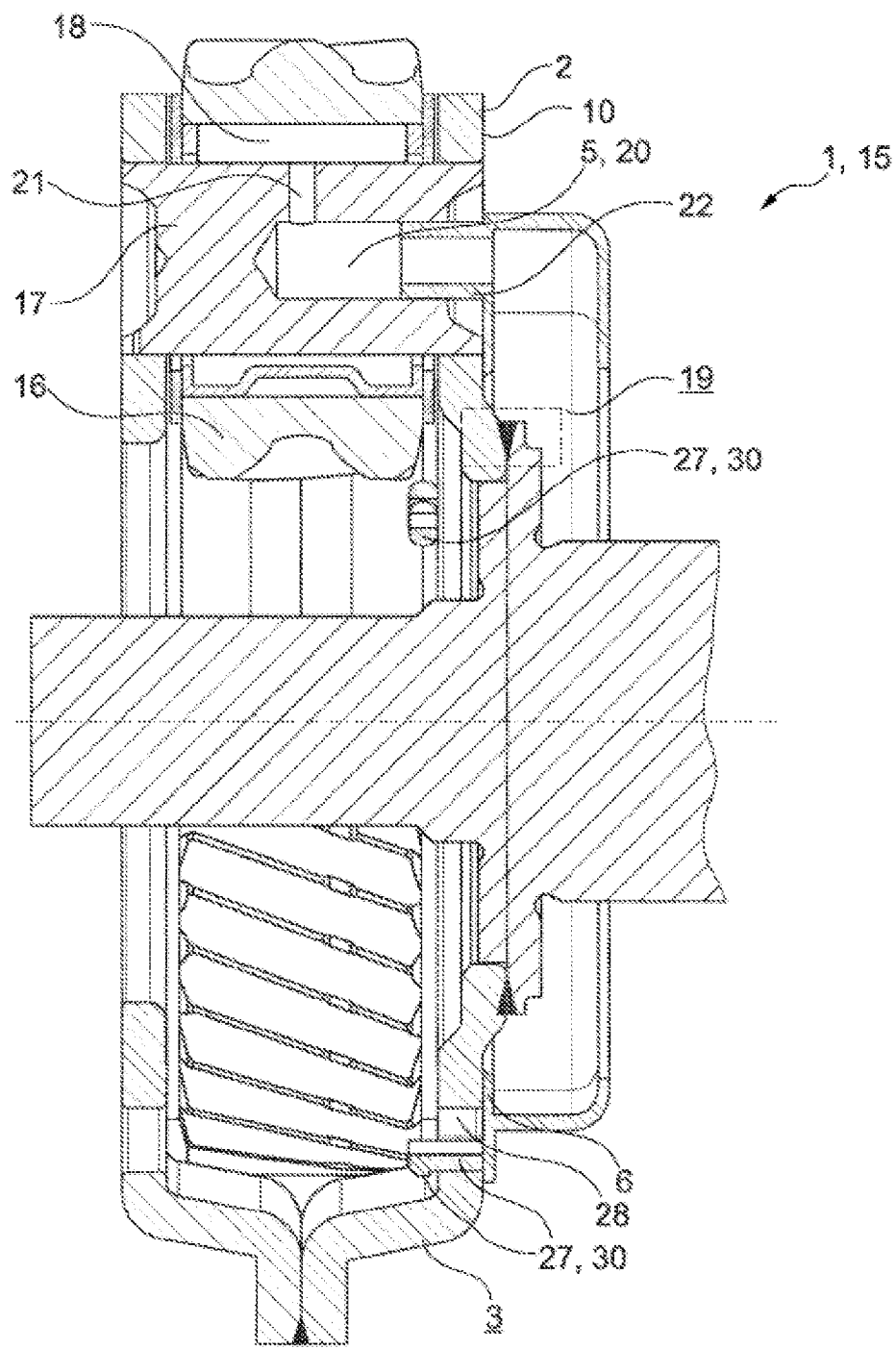
FIG. 1 shows a transmission device 1 with a supporting component 2 and with an oil collector 19.
Figure 2:
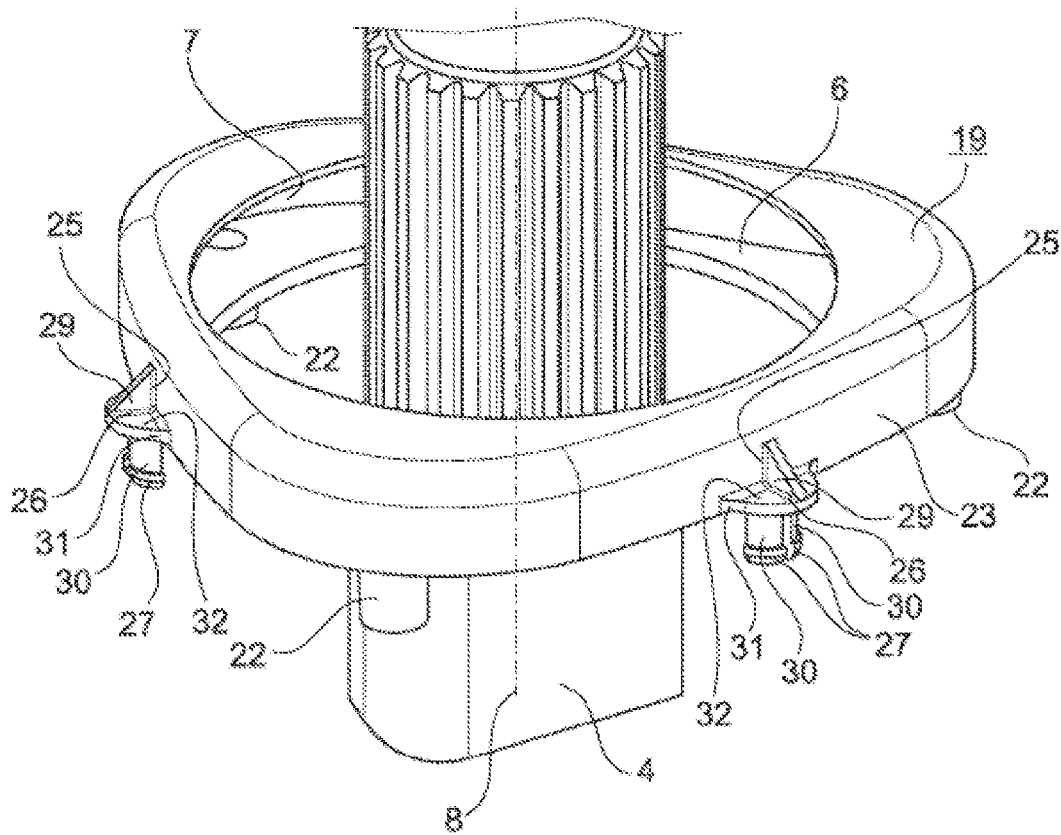
FIG. 2 shows the oil collector 19 in a position in which the oil collector 19 is aligned ready for assembly with a shaft 4; for example, with a shaft 4 of the transmission device 1 shown in FIG. 1.

The following description is made with reference to FIG. 2. FIG. 2 shows the oil collector 19 in a position in which the oil collector 19 is aligned ready for assembly with a shaft 4; for example, with a shaft 4 of the transmission device 1 shown in FIG. 1. The oil collector 19 includes a support plate 6, a channel 7, oil guiding nozzles 22 and fastening elements 30. Platforms 31 are formed in one piece with the channel 7 from plastic, which project radially beyond the outer contour 23 of the channel in the radial direction, i.e., transversely to the axis of symmetry or rotation 8. At least one fastening element 30 projects axially on one side of the respective platform 31 and a projection 29 projects in the axial direction from a surface 32 of the platform 31 on the other side. The respective projection 29 is designed in the form of a gusset and merges with its radial root 25 into the channel 7 in one piece and with its axial root 26 in one piece into the surface 32. The fastening elements 30 are plug connectors with a snap function and have snap lugs 27 for this purpose.

The transmission device shown in FIG. 1 is a planetary gear 15. The planetary gear 15 has a planetary carrier 3, the supporting component 2 of which is designed as a carrier flange. Planetary pins 17 are mounted in the planetary carrier 3. A planet gear 16 sits on each planetary pin 17. Each planetary pin 17 is provided with a blind hole 20 that forms an oil inlet 5. A cross-bore 21 leads from the respective blind hole 20 to a planet bearing 18. The support plate 6 of the oil collector 19 rests axially on an end face 10 of the supporting component 2 and is plugged with the oil guiding nozzle 22 in the blind holes 20. The oil collector 19 is fastened to the supporting component 2 by means of the fastening elements 30 in such a way that the fastening elements 30 axially pass through connecting holes embodied in the wall of the supporting component 2 and designed as through-holes 28 and axially or radially engage with the snap lug 27 on a side of the supporting component 2 facing away from the oil collector 19.

REFERENCE NUMERALS

1 Transmission device
2 Supporting component
3 Planetary carrier
4 Shaft
5 Oil inlet
6 Support plate
7 Channel
8 Axis of rotation of the shaft
10 End face of the supporting component
15 Planetary gear
16 Planet gear
17 Planetary pins
18 Planet bearing
19 Oil collector
20 Blind hole
21 Cross-bore
22 Oil guiding nozzle of the oil collector
23 Outer contour of the channel
25 Radial root
26 Axial root
27 Snap lugs
28 Through-hole
29 Projection
30 Fastening elements
31 Platform
32 Surface

The invention claimed is:

1. A transmission device having at least one oil collector, wherein the transmission device is provided with at least one supporting component which has connecting holes and oil inlets, and the oil collector has at least a support plate and a channel connected to the support plate and running around an axially aligned axis of rotation of the transmission device, wherein the oil collector is also provided with oil guiding nozzles and fastening elements and wherein in each case an oil guiding nozzle is plugged axially in one of the oil inlets, and wherein the oil collector is held on the supporting component by means of the fastening elements which at least partially engage fixedly in each case into one of the connecting holes, wherein on a side facing away from the transmission device each of the fastening elements is followed in the axial direction by a platform which is configured on the oil collector and which projects from the oil collector and which has a planar surface, wherein on each of the platforms at least one projection projects in each case out of the planar surface of the respective platform and projects axially beyond the platform and beyond the surface, wherein the platform projects radially from the oil collector radially beyond an outer contour of the channel.

2. The transmission device according to claim 1, wherein the surface extends in an imaginary radial plane perpendicularly penetrated by the axis of rotation.

3. The transmission device according to claim 2, wherein respective platforms comprise respective planar surfaces running in a common radial plane.

4. The transmission device according to claim 1, wherein one of the fastening elements protrudes axially from the respective platform on a side facing the supporting component.

5. The transmission device according to claim 1, wherein the respective projection is designed as a rib connected to the respective platform and the channel.

6. The transmission device according to claim 1, wherein a form-fitting snap connection is implemented in or on the connecting holes between the supporting component and the fastening elements.

7. The transmission device according to claim 1, wherein the transmission device is at least one planetary gear with the at least one supporting component formed on a planetary carrier, wherein in the planetary gear planet gears are rotatably mounted on planetary pins and the oil collector is fluidly connected to the planetary pins.

8. The transmission device according to claim 7, wherein the oil inlets are holes in the planetary pins, wherein each of the oil guiding nozzles is plugged in one of the holes, and wherein each of the axially aligned holes leads from a respective cross-bore to at least one planet bearing for at least one planet gear.

9. A transmission device comprising:
   an axis of rotation defining an axial direction;
   a supporting component comprising:
      connecting holes; and
      oil inlets; and
   an oil collector comprising:
      a support plate;
      a channel connected to the support plate, the channel running around the axis of rotation and comprising an outer contour;
      oil guiding nozzles plugged axially into the oil inlets;
      fastening elements for holding the oil collector on the supporting component, the fastening elements being at least partially fixedly engaged with the connecting holes; and
      platforms disposed on a side of the fastening elements facing away from the supporting component, the platforms projecting radially from the oil collector radially beyond the outer contour, each platform comprising:
         a planar surface; and
         a projection projecting:
            out of the planar surface; and
            axially beyond the platform.

10. The transmission device of claim 9 wherein the planar surfaces extend in an imaginary radial plane perpendicularly penetrated by the axis of rotation.

11. The transmission device of claim 10 wherein the planar surfaces run in a common radial plane.

12. The transmission device of claim 9 wherein the fastening elements protrude axially from respective platforms on a side facing the supporting component.

13. The transmission device of claim 9 wherein the projections are designed as gussets connected to the respective platform and the channel.

14. The transmission device of claim 9, wherein the fastening elements comprise snap lugs for engaging the connecting holes with a form-fitting snap connection.

15. The transmission device of claim 9 wherein the transmission device is a planetary gear comprising:
   a planetary carrier comprising the supporting component;
   planet pins mounted in the planetary carrier; and
   planet gears rotatably mounted on the planet pins, wherein the oil collector is fluidly connected to the planet pins.

16. The transmission device of claim 15, wherein:
   the planetary gear further comprises planet bearings for rotatably mounting the planet gears on the planet pins;
   the oil inlets are blind holes disposed in the planet pins;
   the oil guiding nozzles are plugged into the blind holes; and
   the planet pins comprise respective cross-bores extending from the blind hole to the planet bearing.

* * * * *